United States Patent [19]

Verwoerd

[11] Patent Number: 6,162,037

[45] Date of Patent: Dec. 19, 2000

[54] APPARATUS FOR REMOVING PRODUCTS FROM AN INJECTION MOLD

[75] Inventor: Willem Teunis Verwoerd, Ederveen, Netherlands

[73] Assignee: Van Den Brink B.V., Harskamp, Netherlands

[21] Appl. No.: 09/091,210

[22] PCT Filed: Dec. 11, 1996

[86] PCT No.: PCT/NL96/00481

§ 371 Date: Jun. 8, 1998

§ 102(e) Date: Jun. 8, 1998

[87] PCT Pub. No.: WO97/21530

PCT Pub. Date: Jun. 19, 1997

[30] Foreign Application Priority Data

Dec. 11, 1995 [NL] Netherlands ............................ 1001868

[51] Int. Cl.$^7$ .................................................. B29C 45/42
[52] U.S. Cl. ........................ 425/126.1; 425/444; 425/556; 425/DIG. 5
[58] Field of Search ................................. 425/126.1, 503, 425/556, 444, DIG. 5, 504; 264/334

[56] References Cited

U.S. PATENT DOCUMENTS

| | | | |
|---|---|---|---|
| 4,795,124 | 1/1989 | Nagai | 425/556 |
| 4,834,641 | 5/1989 | Keyser | 425/503 |
| 4,976,603 | 12/1990 | Disimone | 425/556 |
| 4,983,348 | 1/1991 | Barresi et al. | 425/126.1 |
| 5,513,970 | 5/1996 | Kimura et al. | 425/556 |

FOREIGN PATENT DOCUMENTS

| | | |
|---|---|---|
| 0415153 | 3/1991 | European Pat. Off. . |
| 2666538 | 3/1992 | France . |
| 3839445 | 5/1990 | Germany . |

*Primary Examiner*—Harold Pyon
*Assistant Examiner*—Donald Heckenberg
*Attorney, Agent, or Firm*—Welsh & Katz, Ltd.

[57] ABSTRACT

An apparatus for removing molded products from an injection mold or for placing product parts, such as, for instance, a label, in an injection mold, the apparatus comprising a receiving assembly which comprises at least one receiving element, which receiving element is mounted on a rotary shaft, the apparatus further comprising a first curve mechanism, the movement of the first curve follower thereof relative to the first curve being coupled to the movement of movable arranged mold parts relative to each other, the receiving assembly comprising a receiving assembly body in which the rotary shaft is bearing-mounted for rotation, the receiving assembly body being arranged for movement along a straight guide which extends in a plane extending perpendicularly to the rotary shaft and in a different direction than the main direction, the first curve mechanism consisting a drive of at least the displacement of the receiving assembly body along the straight guide.

34 Claims, 6 Drawing Sheets

APPARATUS FOR REMOVING PRODUCTS FROM AN INJECTION MOLD

BACKGROUND OF THE INVENTION

This invention relates to an apparatus for removing products from an injection mold or for placing product parts in an injection mold.

Such an apparatus is described, for instance, in EP-B-0 415 153. The know apparatus comprises a receiving element mounted on the free end of a swivelling arm which is connected through its other end to a rotary shaft which is fixedly connected to a first mold part. The swivelling position of the swivelling arm is controlled by means of a curve mechanism, of which the curve is connected to the second mold part and the curve follower is connected to the rotary shaft via a track and pinion. The advantage of this way of controlling the swivelling position of the swivelling arm is that the total path to be traversed by the receiving element takes place during the cycle of the opening and closure of the mold parts.

Accordingly, relative to the mold part to which the rotary shaft is connected, the receiving element can only traverse a simple circular path. The position of the receiving element, which is constructed as a suction cup in the known apparatus, relative to the swivelling arm is always the same. A first drawback is therefore that the possible positions and orientation in which the product to be removed can be delivered are very limited.

Owing to the movement of the receiving element being only a swivelling movement, products with a higher profile, such as, for instance, buckets, cannot be taken from the mold using the known apparatus, since the path of the product is an arc of a circle, which makes it impossible to slide the product off the core. Moreover there is a possibility that the product cannot be moved from between the two mold parts when only a path describing an arc of a circle can be traversed. A second drawback is therefore that the path of movement of the product to be removed cannot be chosen freely.

A third drawback of the known apparatus is that after the mold parts have been closed, the receiving element cannot be displaced further because the rotary shaft of the swivelling arm is fixedly connected to the mold. As a result, there is no possibility of further maneuvering of the product without transferring it to a further positioning device. The drawback of transferring the products to further positioning devices is that the position of the products may be disturbed during transfer.

The apparatus which is described in U.S. Pat. No. 3,700,375 also has the above-described drawbacks. The receiving element in this known apparatus is connected via a parallelogram linkage to a rotary shaft which is fixedly arranged with respect to one of the mold parts. In this known apparatus too the receiving element moves along a simple arc of a circle with respect to the mold part to which the rotary shaft is connected. Accordingly, the product to be removed moves along a fixed path which cannot be chosen freely and the range of possibilities with regard to the position and the orientation of the product in the delivery position is also very limited. It moreover holds for this apparatus too that after the mold parts have been closed, the receiving element cannot be moved any further because the rotary shaft of the swivelling arm is fixedly connected to the mold.

SUMMARY OF THE INVENTION

The object of the invention is to provide an apparatus of the above-mentioned type without the drawbacks mentioned.

Using a thus-connected apparatus, owing to the rotary shaft being movable along a linear path defined by the guide, which extends in a plant perpendicular to the rotary shaft mentioned and in a direction which deviates from the main direction, an optimum product path between the closing mold parts can be realized as well as an optimum end position of the product.

Through a suitable design of the mechanism with which the rotational position of the rotary shaft is determined and of the first curve mechanism with which the position of the receiving assembly body relative to the guide is determined, it is possible, optionally using a suitably designed swivelling arm assembly, to realize virtually any course of the path.

According to a further elaboration of the invention, it can be provided that the delivery position is varied for successive products, which is particularly advantageous, for instance, when the apparatus is also used for forming a stack of removed products. By choosing the delivery position slightly higher each time, the increasing height of the stack is taken into account.

BRIEF DESCRIPTION OF THE DRAWING

Further elaborations of the invention will be further clarified hereinafter with reference to the drawing.

DETAILED DESCRIPTION OF THE INVENTION

Figure 1:
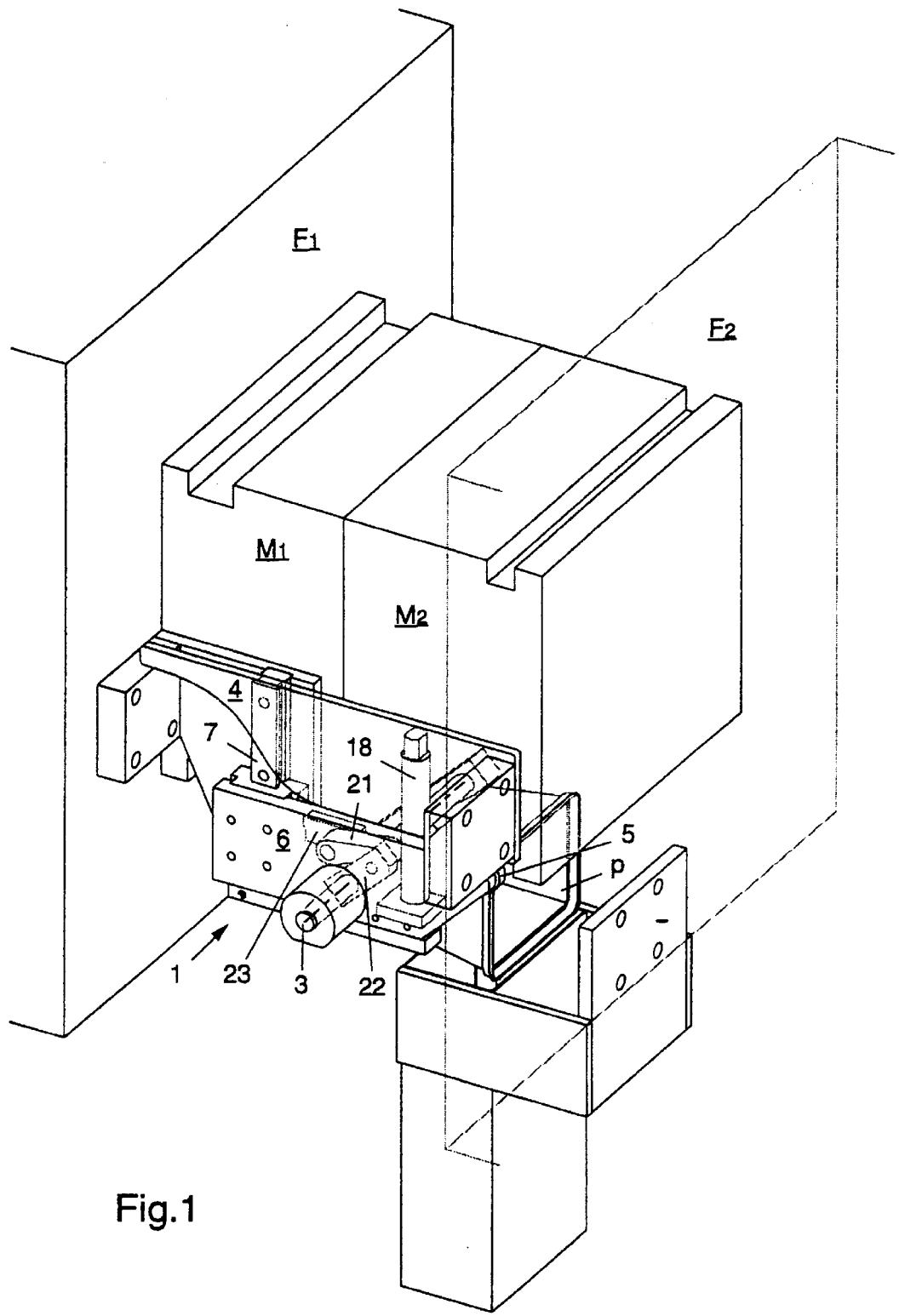
FIG. 1 shows a perspective view of a first embodiment, with the mold parts in the closed position.

All apparatuses shown are intended for removing products P from an injection mold. However, similar apparatuses can equally be used for placing product parts, such as, for instance, a label, in an injection mold. Such an injection mold generally comprises at least two mold parts M1, M2, which are arranged so as to be movable away from and towards each other in a first main direction. The apparatus as represented in the figures comprises a receiving assembly 1 which comprises at least one receiving element 2, which receiving element 2 is mounted, optionally via a swivelling arm assembly 11 or 12, 13, on a rotary shaft 3. The or each receiving element 2 is movable from an engagement position, in which the or each receiving element 2 engages a product P disposed in a mold part M1, to a delivery position, in which the or each receiving element 2 is disposed for the purpose of delivering the received product P. The apparatus further comprises a first curve mechanism 4, 5 which comprises a first curve 4 and a first curve follower 5. The movement of the first curve follower 5 relative to the first curve 4 is coupled to the movement of movably arranged mold parts M1, M2 relative to each other. The receiving assembly 1 comprises a receiving assembly body 6 in which the rotary shaft 3 is bearing-mounted for rotation. The receiving assembly body 6 is arranged for movement along a straight guide 7 which extends in a plane extending perpendicularly to the rotary shaft 3 and in a different direction than the main direction referred to. The first curve mechanism 4, 5 constitutes a drive of at lest the displacement of the receiving assembly body 6 along the straight guide 7 mentioned. A spring 18, such as, for instance, a pneumatic spring 18, presses the receiving assembly 1 in a direction such that the curve follower 5 always abuts against the curve 4.

In the different figures, the parts having the same function are designated by the same reference numerals.

Figure 2:
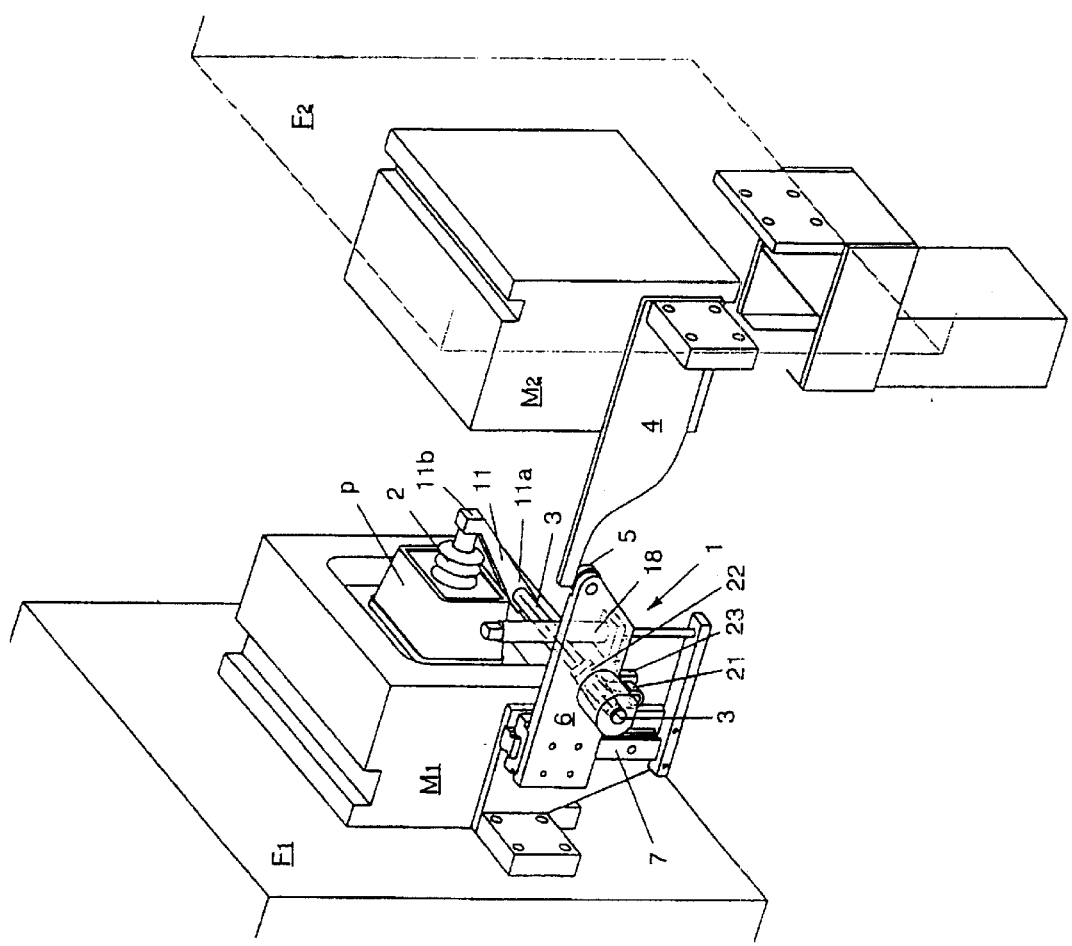
FIG. 2 shows a similar perspective view of the apparatus shown in FIG. 1, with the mold parts in an open position.

In the embodiment shown in FIGS. 1 and 2, the rotational position of the rotary shaft 3 is controlled by means of a toggle lever system 21, 22, of which one lever 21 through a first end thereof is pivotally connected to a stationary machine part 23 and the other lever 22 through a first end thereof is non-rotatably connected to the rotary shaft 3. The two knee levers 21, 22 are pivotally connected to each other through their second ends. Further, this embodiment has a swivelling arm assembly 11 comprising a first swivelling arm 11a which has a first end fixedly connected to the rotary shaft 3 and carries the receiving element 2 on a second end. With this relatively simple mechanism, a comparatively complex product path can be described in an operatively reliable manner, while further the product is delivered in an inverted orientation to, for instance, a guide track (not shown) for the further discharge of the product. Obviously, the rotational position of the rotary shaft 3 can also be effected in a different way. Of course, this applies in general and not only to the embodiments represented in FIGS. 1 and 2. For instance, instead of a toggle lever system, a gear rack assembly, a toothed belt or the like could be used. However, the starting-point remains that the angular displacement of the rotary shaft 3 is mechanically coupled to the displacement of the receiving assembly body 6 along the straight guide 7 and hence to the position of the mold parts M1 and M2 relative to each other.

In the exemplary embodiments represented in FIGS. 3–6, the rotational position of the rotary shaft 3 is controlled by means of a second curve mechanism 8, 9, which comprises a second curve 8 and a second curve follower 9 which is connected to a lever 10 fixedly connected to the rotary shaft 3. The movement of the second curve follower 9 along the second curve 8 too is controlled by displacement of the receiving assembly body 6 along the straight guide 7 mentioned.

Figure 3:
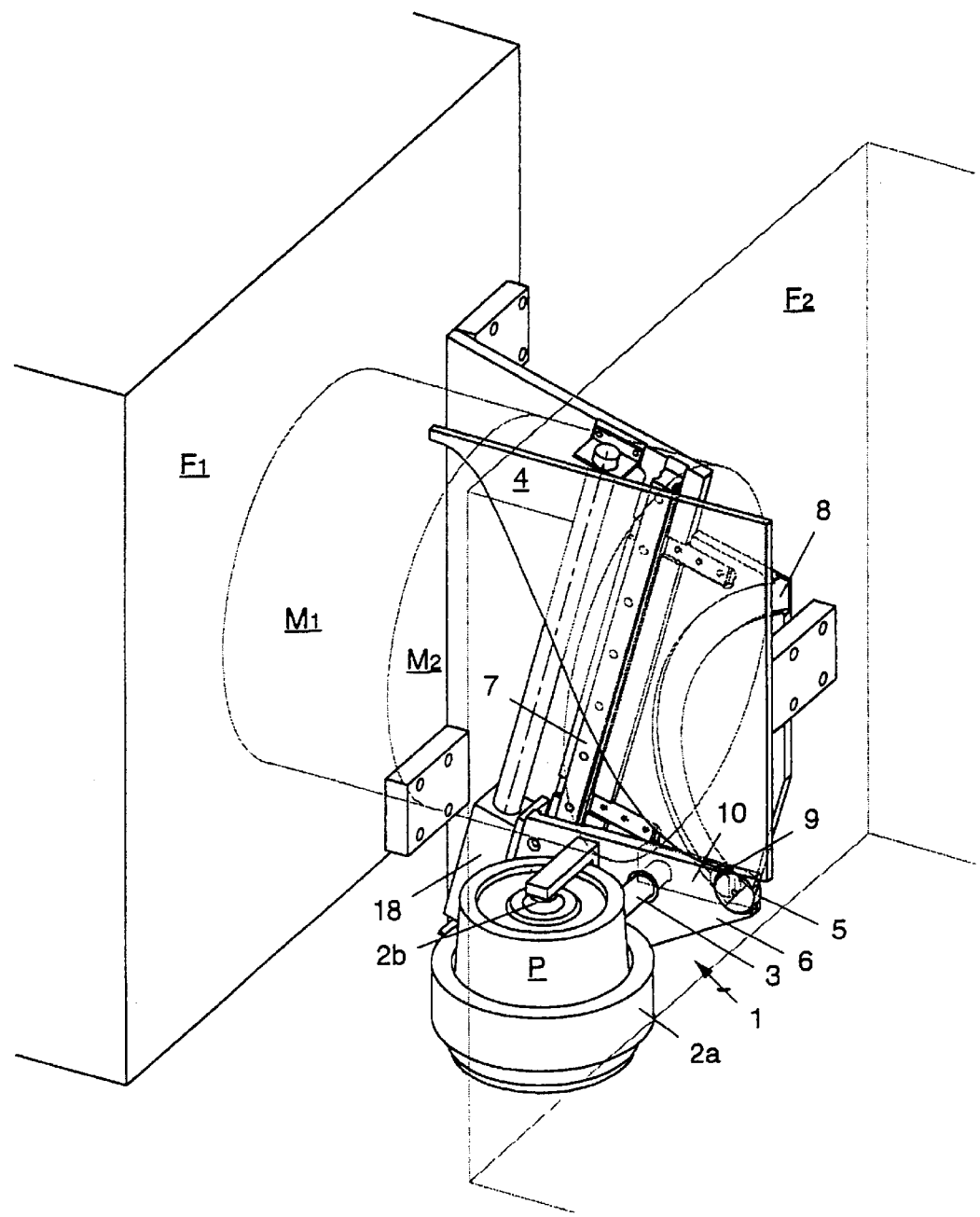
FIG. 3 shows a perspective view of a second embodiment, with the mold parts in the closed position.
Figure 4:
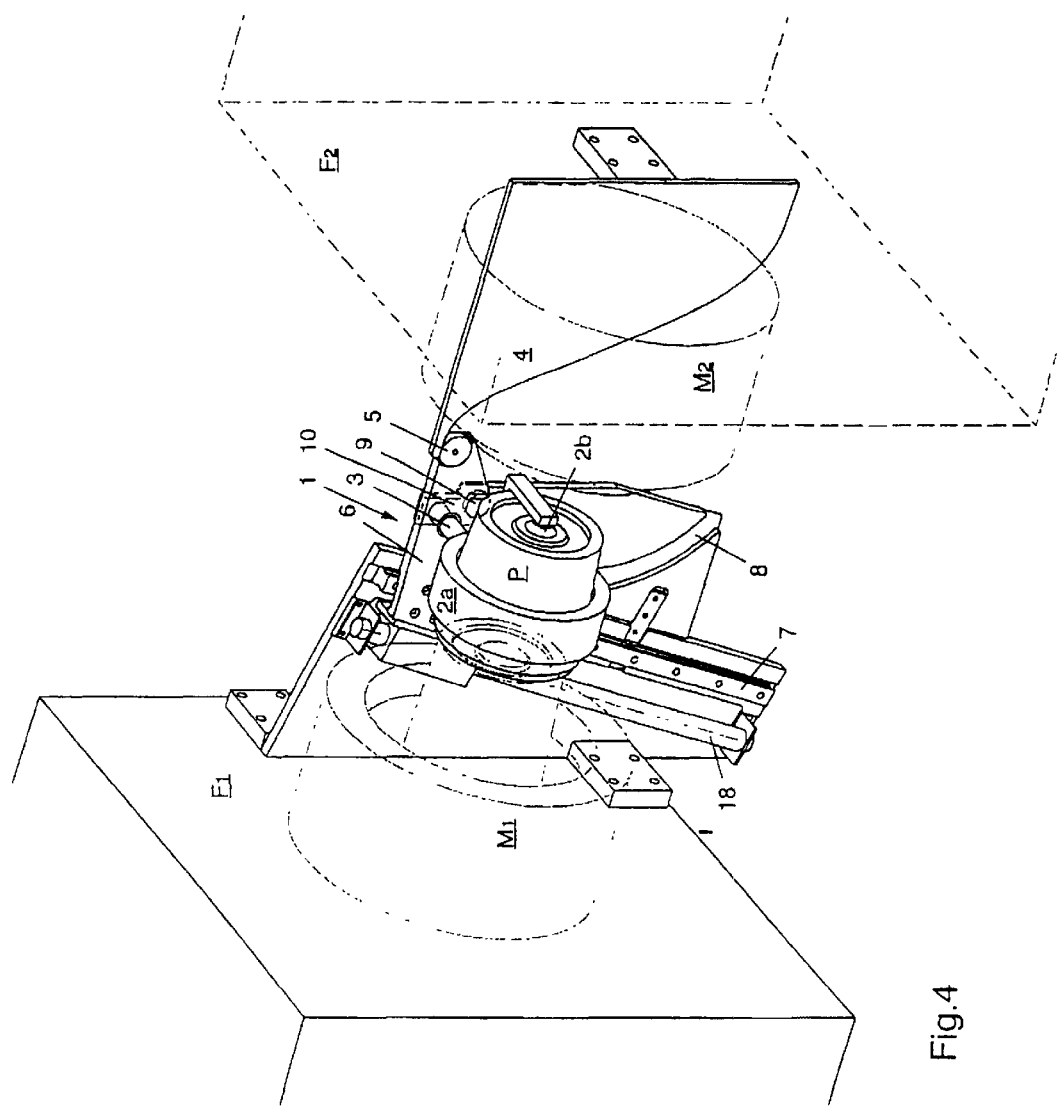
FIG. 4 shows a similar perspective view of the apparatus shown in FIG. 3, with the mold parts in an open position.

In the embodiment represented in FIGS. 3–4, the swivelling arm assembly is absent and the receiving element 2 is mounted directly on the rotary shaft 3. The receiving element used in this embodiment consists of a ring 2a and a suction cup 2b which is connected to the ring 2a. The ring engages the outer surface of the product P, which is a bucket in the present example. Using the suction cup 2b, the bucket P is held in a fixed position relative to the ring 2a. It is also possible that the suction cup 2b is absent and the ring 2a itself comprises suction means causing the bucket to be held in a fixed position in the ring 2a. The receiving element 2 can also be designed as a sleeve in which the bucket P is received with a proper fit. When the bucket P has been received in the sleeve, a reduced pressure can be produced in the sleeve, so that the bucket is subjected to suction in the sleeve. Using this embodiment, it is yet possible for the product P having a very high profile and a correspondingly large core to be removed automatically from the mold M1, M2 during the cycle time in which the mold parts M1, M2 open. Moreover, because the optimum path can be chosen, the distance over which the mold parts M1, M2 must be moved apart can be kept to a minimum, which also has a favorable effect on the length of the cycle time. For that matter, this advantage applies to all embodiments set forth therein.

Figure 5:
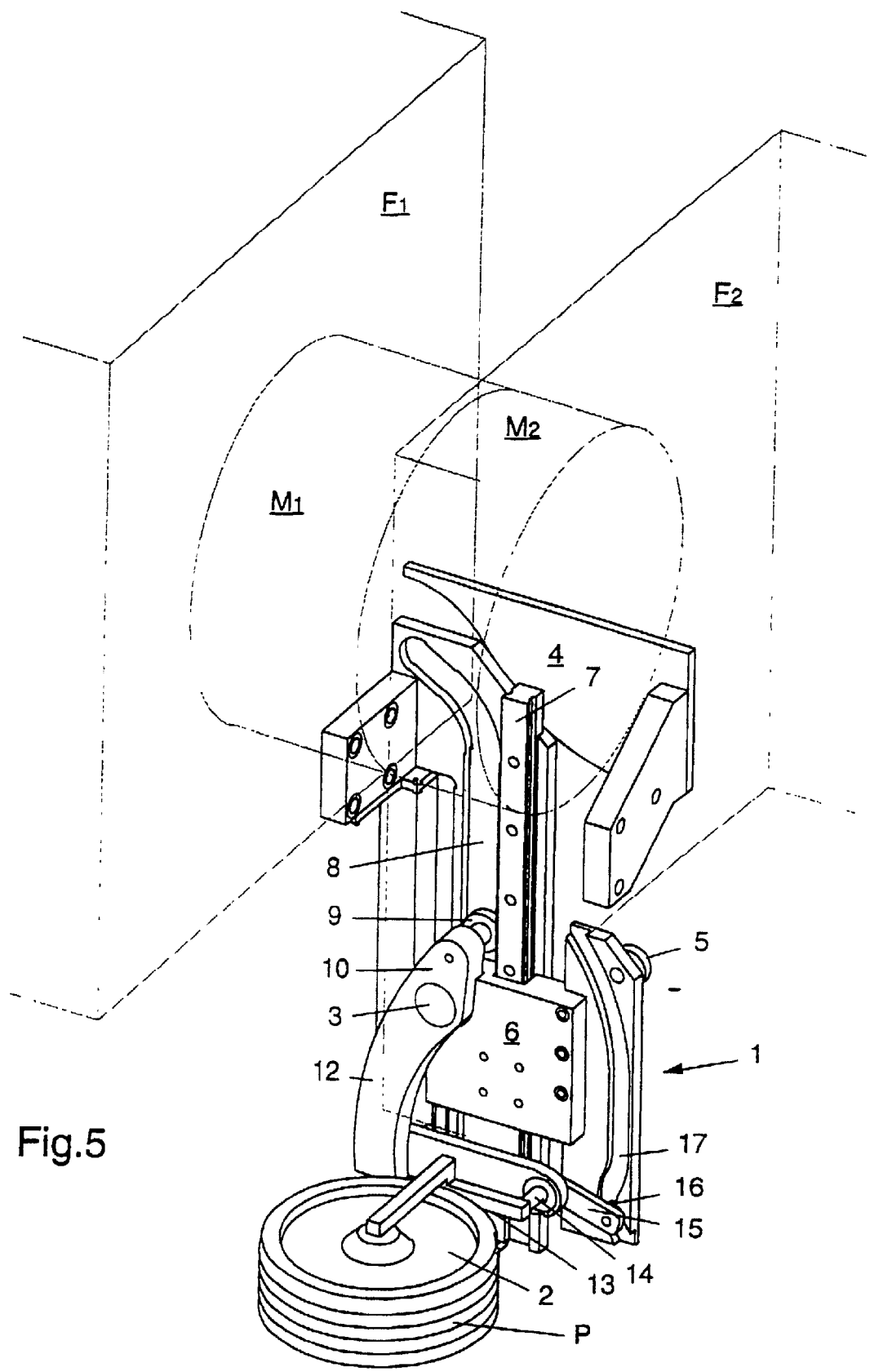
FIG. 5 shows a perspective view of a third embodiment, with the mold parts in the closed position.
Figure 6:
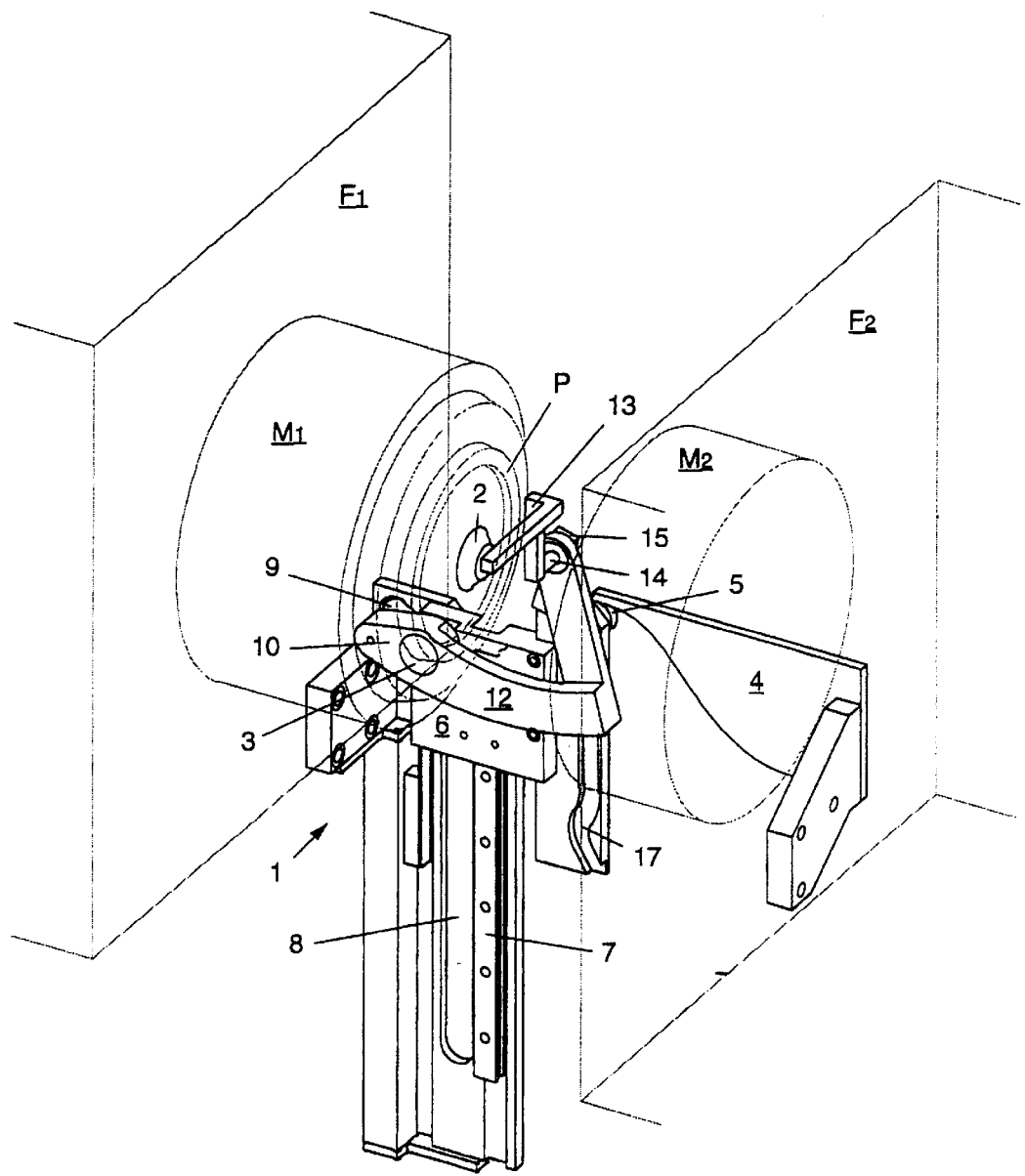
FIG. 6 shows a similar perspective view of the apparatus shown in FIG. 5, with the mold parts in an open position.

The swivelling assembly of the embodiment represented in FIGS. 5–6 comprises a first and a second swivelling arm 12 and 13, respectively, the first swivelling arm 12 being fixedly connected to the rotary shaft 3 through a first end 12a and a second rotary shaft 14 being rotatably bearing-mounted on a second end. The second rotary shaft 14 is fixedly connected to a first end of a second swivelling arm 13 which carries the receiving element 2 on a second end. The second rotary shaft 14 is further fixedly connected to a second lever 15 which at the free end thereof carries a third curve follower 16 of a third curve mechanism 16, 17, which also comprises a third curve 17. The rotational position of the second rotary shaft 14 is controlled by this third curve mechanism 16, 17. Here too, it holds that the control of the rotational position could be effected with rod systems, gear rack mechanisms, toothed belts and the like.

In all exemplary embodiments shown, the apparatus is part of an injection molding machine, of which only the mold mounting plates F1, F2 have been represented. The two mold mounting plates F1, F2 are movable with respect to each other in the main direction and are part of the injection molding machine. The first curve 4 is connected to one mold mounting plate F2 of the injection molding machine and the first curve follower 5 of the apparatus is connected via the receiving assembly 1 to another mold mounting plate F1.

An advantage of such a design is that the exchange of the mold can occur without also having to disassemble the present apparatus with all the associated risks of damage.

It is also quite possible, however, for the apparatus to be part of a mold M comprising at least two mold parts M1, M2, the first curve 4 being connected to a first mold part M2 and the first curve follower 5 of the apparatus being connected via the receiving assembly 1 to a second mold part M1.

Such a design has the advantage that during assembly of the mold the receiving assembly 1 and the curve 4 need not be mounted with respect to the mold because they are already attached to it.

It will be clear that on the one hand it is possible that the receiving assembly 1 is connected to the movably arranged mold parts M1 and the movably arranged mold mounting plate F1, respectively, while the curve 4 is connected to the stationary mold part M2, and the stationary mold mounting plate F2, respectively. On the other hand, it is possible that the receiving assembly 1 is connected to the stationarily arranged mold part M2 and mold mounting plate F2, respectively, while the curve 4 is connected to the movably arranged mold part M1 and the movably arranged mold mounting plate F1, respectively.

In order to enable a particularly simple further discharge of the products, it is particularly favorable when the delivery position is located in an area located under an area in which the mold parts M1, M2 are movable away from and towards each other. The products can be placed there, for instance, on an endless conveyor which takes care of the further discharge of the products. It will be clear that the delivery position under the area where the mold parts are movable is only a preferred embodiment and that the invention is not limited thereto. Thus, the delivery position can also be located next to or above the mold parts M1, M2.

It will be clear that the possibility exists of varying the location of the delivery position when the apparatus comprises an independent drive which is controllable independently of the relative position of the two mold parts M1, M2, and which is arranged for taking over the displacement of the receiving assembly body 6 along the straight guide 7, controlled by the first curve mechanism 4, 5. Such a separate drive can be designed, for instance, as a controllable pneumatic piston/cylinder assembly or an electromagnetic actuator. This is the case, for instance, in the embodiment which is represented in FIGS. 5 and 6, where the straight guide 7 continues further downwards. In the lower part of the straight guide 7 the displacement of the receiving assembly body 6 is no longer controlled by the first curve mechanism 4, 5 but by a separate drive, not visible in FIGS. 5 and 6. FIG. 5 clearly shows that the curve follower 5 no longer abuts against the curve 4 and that therefore the vertical position of the receiving assembly 1 is controlled in a different way.

When the apparatus is a product part feeding device, which is used, for instance, for placing labels in the mold before the product is molded therein, the delivery position is the position where the product part is received and the engagement position is the position where the product part is placed in a mold part M1 or M2. In this case, the delivery position is preferably located above the area in which the mold parts are movable. When in that case the injection molding machine further comprises an apparatus for removing products, the product parts, such as, for instance, labels, can be placed from above while the products can be removed from below.

The invention is not limited to the exemplary embodiments described. Within the scope of the invention, diverse variants are possible.

What is claimed is:

1. An apparatus for removing products from an injection mold or for placing product part in an injection mold, which injection mold comprises at least two mold parts which are arranged so as to be movable away from and towards each other in a first main direction, the apparatus comprising a receiving assembly which comprises at least one receiving element, which receiving element is connected to a rotary shaft, the or each receiving element being movable from a first position in which the or each receiving element engages a product disposed in a mold part, to a second position in which the or each receiving element is disposed for the purpose of delivering the received product, the apparatus further comprising a first curve mechanism which comprises a first curve and a first curve follower, the movement of the first curve follower relative to the first curve being coupled to the movement of movably arranged mold parts relative to each other, the receiving assembly comprising a receiving assembly body in which the rotary shaft is rotatably mounted in bearings, the receiving assembly body being movable along a straight line extending in a plane extending perpendicularly to the rotary shaft and in a different direction than said first main direction, the first curve mechanism providing for the movement of the receiving assembly body along said straight guide, and the rotational position of the rotary shaft being mechanically coupled to the relative position of the mold parts.

2. An apparatus according to claim 1, wherein the rotational position of the rotary shaft is controlled by means of a second curve mechanism comprising a second curve and a second curve follower which is connected to a lever fixedly connected to the rotary shaft, the movement of the second curve follower along the second curve being controlled by displacement of the receiving assembly body along said straight guide.

3. An apparatus according to claim 1, wherein the rotational position of the rotary shaft is controlled by means of a toggle lever system, of which a first lever is pivotally connected through a first end to a stationary machine part, and a second lever through a first end thereof is non-rotatably connected to the rotary shaft, the first and second levers being pivotally connected to each other through second ends.

4. An apparatus according to claim 1, wherein the receiving element is mounted directly on the rotary shaft.

5. An apparatus according to claim 1, further including a first swivelling arm fixedly connected to the rotary shaft through a first end carrying the receiving element on a second end.

6. An apparatus according to claim 3, further including a swivelling assembly which comprises a first and a second swivelling arm, the first swivelling arm being fixedly connected to the rotary shaft through a first end and a second rotary shaft being rotatably bearing-mounted on a second end thereof, the second rotary shaft being fixedly connected to a first end of a second swivelling arm which carries the receiving element on a second end, the second rotary shaft being also fixedly connected to a second lever which at the free end thereof carries a third curve follower of a third curve mechanism, which also comprises a third curve.

7. An apparatus according to claim 1, wherein it is part of a mold comprising at least two mold parts, the first curve being connected to a first mold part, and the first curve follower of the apparatus being connected to a second mold part via the receiving assembly.

8. An apparatus according to claim 1, wherein it is part of an injection molding machine, the first curve being connected to one mold mounting plate of the injection molding machine and the first curve follower of the apparatus being connected via the receiving assembly to another mold mounting plate, the two mold mounting plates being movable with respect to each other in the main direction and forming part of the injection molding machine.

9. An apparatus according to claim 1, wherein when the apparatus is a product removing machine, and the delivery position is located in an area located under an area in which the mold parts are movable away from and towards each other.

10. An apparatus according to claim 1, wherein the location of the delivery position can be varied in that the apparatus comprises an independent drive which is controllable independently of the relative position of the two mold parts and which is arranged for taking over the displacement of the receiving assembly body along the straight guide controlled by the first curve mechanism.

11. An apparatus according to claim 1, wherein it is a product part feeding device, the second position being the position where the product part is received and the first position being the position where the product part is placed in a mold part.

12. An apparatus according to claim 11, wherein the second position is located in an area located above the area in which the mold parts are movable.

13. An apparatus for removing products from an injection mold or for placing product parts in an injection mold, which injection mold comprises at least two mold parts which are arranged so as to be movable away from and towards each other in a first main direction, the apparatus comprising a receiving assembly which comprises at least one receiving element, which receiving element is connected to a rotary shaft, the or each receiving element being movable from a first position in which the or each receiving element engages a product disposed in a mold part, to a second position in which the or each receiving element is disposed for the purpose of delivering the received product, the apparatus further comprising a first curve mechanism which comprises a first curve and a first curve follower, the movement of the first curve follower relative to the first curve being coupled to the movement of movably arranged mold parts relative to each other, the receiving assembly comprising a receiving assembly body capable of movement in which the rotary shaft is rotatably mounted in bearings, the receiving assembly body along a straight line extending in a plane extending perpendicularly to the rotary shaft and in a different direction than said first main direction, the first curve mechanism providing for the movement of the receiving assembly body along said straight guide, and the rotational position of the rotary shaft being mechanically coupled to the relative position of the mold parts, and controlled by means of a second curve mechanism comprising a second curve and a second curve follower which is connected to a lever fixedly connected to the rotary shaft, the movement of the second curve follower along the second curve being controlled by displacement of the receiving assembly body along said straight guide.

14. An apparatus according to claim 13, wherein the rotational position of the rotary shaft is controlled by means of a toggle lever system, of which a first lever is pivotally connected through a first end to a stationary machine part, and a second lever through a first end thereof is non-rotatably connected to the rotary shaft, the first and second levers being pivotally connected to each other through second ends.

15. An apparatus according to claim 13, wherein the receiving element is mounted directly on the rotary shaft.

16. An apparatus according to claim 13, further including a first swivelling arm fixedly connected to the rotary shaft through a first end carrying the receiving element on a second end.

17. An apparatus according to claim 13, further including a swivelling assembly which comprises a first and a second swivelling arm, the first swivelling arm being fixedly connected to the rotary shaft through a first end and a second rotary shaft being rotatably bearing-mounted on a second end thereof, the second rotary shaft being fixedly connected to a first end of a second swivelling arm which carries the receiving element on a second end, the second rotary shaft being also fixedly connected to a second lever which at the free end thereof carries a third curve follower of a third curve mechanism, which also comprises a third curve.

18. An apparatus according to claim 13, wherein it is part of a mold comprising at least two mold parts, the first curve being connected to a first mold part, and the first curve follower of the apparatus being connected to a second mold part via the receiving assembly.

19. An apparatus according to claim 13, wherein it is part of an injection molding machine, the first curve being connected to one mold mounting plate of the injection molding machine and the first curve follower of the apparatus being connected via the receiving assembly to another mold mounting plate, the two mold mounting plates being movable with respect to each other in the main direction and forming part of the injection molding machine.

20. An apparatus according to claim 13, wherein when the apparatus is a product removing machine, and the delivery position is located in an area located under an area in which the mold parts are movable away from and towards each other.

21. An apparatus according to claim 13, wherein the location of the delivery position can be varied in that the apparatus comprises an independent drive which is controllable independently of the relative position of the two mold parts and which is arranged for taking over the displacement of the receiving assembly body along the straight guide controlled by the first curve mechanism.

22. An apparatus according to claim 13, wherein it is a product part feeding device, the second position being the position where the product part is received and the first position being the position where the product part is placed in a mold part.

23. An apparatus according to claim 22, wherein the second position is located in an area located above the area in which the mold parts are movable.

24. An apparatus for removing products from an injection mold or for placing product parts in an injection mold, which injection mold comprises at least two mold parts which are arranged so as to be movable away from and towards each other in a first main direction, the apparatus comprising a receiving assembly which comprises at least one receiving element, which receiving element is connected to a rotary shaft, the or each receiving element being movable from a first position in which the or each receiving element engages a product disposed in a mold part, to a second position in which the or each receiving element is disposed for the purpose of delivering the received product, the apparatus further comprising a first curve mechanism which comprises a first curve and a first curve follower, the movement of the first curve follower relative to the first curve being coupled to the movement of movably arranged mold parts relative to each other, the receiving assembly comprising a receiving assembly body in which the rotary shaft is rotatably mounted in bearings, the receiving assembly body capable of movement along a straight line extending in a plane extending perpendicularly to the rotary shaft and in a different direction than said first main direction, the first curve mechanism providing for the movement of the receiving assembly body along said straight guide, and the rotational position of the rotary shaft being mechanically coupled to the relative position of the mold parts, and controlled by means of a toggle lever system, of which a first lever is pivotally connected through a first end to a stationary machine part, and a second lever through a first end thereof is non-rotatably connected to the rotary shaft, the first and second levers being pivotally connected to each other through second ends.

25. An apparatus according to claim 24, wherein the receiving element is mounted directly on the rotary shaft.

26. An apparatus according to claim 24, further including a first swivelling arm fixedly connected to the rotary shaft to the rotary shaft through a first end carrying the receiving element on a second end.

27. An apparatus according to claim 24, further including a swivelling assembly which comprises a first and a second swivelling arm the first swivelling arm, being fixedly connected to the rotary shaft through a first end and a second rotary shaft being rotatably bearing-mounted on a second end thereof, the second rotary shaft being fixedly connected to a first end of a second swivelling arm which carries the receiving element of a second end, the second rotary shaft being also fixedly connected to a second lever which at the free end thereof carries a third curve follower of a third curve mechanism, which also comprises a third curve.

28. An apparatus according to claim 24, wherein it is part of a mold comprising at least two mold parts, the first curve being connected to a first mold part, and the first curve follower of the apparatus being connected to a second mold part via the receiving assembly.

29. An apparatus according to claim 24, wherein it is part of an injection molding machine, the first curve being connected to one mold mounting plate of the injection molding machine and the first curve follower of the apparatus being connected via the receiving assembly to another mold mounting plate, the two mold mounting plates being movable with respect to each other in the main direction and forming part of the injection molding machine.

30. An apparatus according to claim 24, wherein when the apparatus is a product removing machine, and the delivery position is located in an area located under an area in which the mold parts are movable away from and towards each other.

31. An apparatus according to claim 24, wherein the location of the delivery position can be varied in that the apparatus comprises an independent drive which is controllable independently of the relative position of the two mold parts and which is arranged for taking over the displacement of the receiving assembly body along the straight guide controlled by the first curve mechanism.

32. An apparatus according to claim 24, wherein it is a product part feeding device, the second position being the position where the product part is received and the first position being the position where the product part is placed in a mold part.

33. An apparatus according to claim 32, wherein the second position is located in an area located above the area in which the mold parts are movable.

34. An apparatus for removing products from an injection mold or for placing product parts in an injection mold, which injection mold comprises at least two mold parts which are arranged so as to be movable away from and towards each other in a first main direction, the apparatus comprising a receiving assembly which comprises at least one receiving element, which receiving element is connected to a rotary shaft, the or each receiving element being movable from a first position in which the or each receiving element engages a product disposed in a mold part, to a second position in which the or each receiving element is disposed for the purpose of delivering the received product, the apparatus further comprising a first curve mechanism which comprises a first curve and a first curve follower, the movement of the first curve follower relative to the first curve being coupled to the movement of movably arranged mold parts relative to each other, the receiving assembly comprising a receiving assembly body in which the rotary shaft is rotatably mounted in bearings, the receiving assembly body being capable of movement along a straight line extending in a plane extending perpendicularly to the rotary shaft and in a different direction than said first main direction, the first curve mechanism providing for the movement of the receiving assembly body along said straight guide, and the rotational position of the rotary shaft being mechanically coupled to the relative position of the mold parts and controlled by means of a toggle lever system, of which a first lever is pivotally connected through a first end to a stationary machine part, and a second lever through a first end thereof is non-rotatably connected to the rotary shaft, the first and second levers being pivotally connected to each other through second ends.

* * * * *